United States Patent [19]

Walsh et al.

[11] 4,389,462
[45] Jun. 21, 1983

[54] PROCESS FOR ENCLOSING A PIN SHANK WITHIN AN ENCLOSING MEMBER AND ARTICLE PRODUCED THEREBY WHICH IS SUBSTANTIALLY DEVOID OF A GAP BETWEEN THE ENCLOSING MEMBER AND THE HEAD OF THE PIN

[75] Inventors: Paul J. Walsh; Jeffrey A. Burkart, both of Kokomo, Ind.

[73] Assignee: Cabot Corporation, Kokomo, Ind.

[21] Appl. No.: 281,541

[22] Filed: Jul. 8, 1981

[51] Int. Cl.³ .............................................. B32B 15/16
[52] U.S. Cl. ................................... 428/564; 428/553; 219/99; 419/8
[58] Field of Search ........................ 428/553, 564, 576; 75/208 R, 201; 219/98, 99; 411/171, 900, 902

[56] References Cited

U.S. PATENT DOCUMENTS

| | | |
|---|---|---|
| 1,266,989 | 5/1918 | Prime . |
| 2,893,762 | 7/1959 | Haynes . |
| 2,993,982 | 7/1961 | Glover . |
| 3,620,119 | 11/1971 | King . |
| 3,760,143 | 9/1973 | Rondeau . |
| 3,891,332 | 6/1975 | Molyneux . |
| 3,914,178 | 10/1975 | Fineran . |
| 4,123,266 | 10/1978 | Foley . |
| 4,129,444 | 12/1978 | Dreyer . |
| 4,154,139 | 5/1979 | Hage . |
| 4,188,459 | 2/1980 | Hyner . |

Primary Examiner—Brooks H. Hunt
Assistant Examiner—Matthew A. Thexton
Attorney, Agent, or Firm—J. Schuman; R. F. Dropkin

[57] ABSTRACT

A composite article having particular utility as a welding stud and a process for producing the article. The article is comprised of a pin and an enclosing member formed from a dissimilar material. The pin is comprised of a head and a shank. The pin is formed from a metal. The cross-section of the head is larger than that of the shank in a direction normal to the length of the pin. The enclosing member fits over and is adhered to the shank. The enclosing member is formed from material in powder form. It is placed upon the shank and sintered thereon. The enclosing member fits up against the head so that the article is substantially devoid of a gap therebetween. The absence of a gap is attributable to the shape of the shank. The cross-section of the shank is larger, in a direction normal to the length of the pin, adjacent the head than over other parts thereof.

14 Claims, 4 Drawing Figures

PROCESS FOR ENCLOSING A PIN SHANK WITHIN AN ENCLOSING MEMBER AND ARTICLE PRODUCED THEREBY WHICH IS SUBSTANTIALLY DEVOID OF A GAP BETWEEN THE ENCLOSING MEMBER AND THE HEAD OF THE PIN

The present invention relates to a process for enclosing a pin shank within an enclosing member and to the article produced thereby, and more specifically, to a process for forming a composite welding stud by enclosing a pin formed of a weldable metal within an enclosing member of a dissimilar material and to the composite welding stud produced thereby.

The composite welding stud of the present invention is characterized by an enclosing member which fits over a shank and up against the weldable head of a pin in such a manner that the stud is substantially devoid of a gap between the enclosing member and the head. The pin is formed from a weldable metal. The enclosing member is formed from material in powder form. The material of the enclosing member is dissimilar to that of the pin. It is a material which will provide the stud with a property not attributable to the metal of the pin. It is generally a metal having better wear and/or corrosion resistance than the metal from which the pin is formed. The close fit between the enclosing member and the head is attributable to the geometry of the shank. The cross-section of the shank is larger, in a direction normal to the length of the pin, adjacent the head than over other parts thereof.

Various types of welding studs are disclosed in the literature as are various types of composite members. Exemplary studs are found in U.S. Pat. Nos. 2,893,762; 2,993,982; 3,760,143; and 3,891,322. Exemplary composite members are found in U.S. Pat. Nos. 1,266,989; 3,620,119; 3,914,178; 4,154,139; and 4,188,459. None of these references disclose the article of the present invention, no less the process for making it. Of them, U.S. Pat. No. 3,620,119 appears to be the most relevant. FIG. 2 of U.S. Pat. No. 3,620,119 shows a fillet F up against the head 11 of fastener 10. Fillet F is, however, different from that portion of the shank of the present invention which is larger than the remaining portion, and is present for a different reason than is the larger portion of the shank of the present invention. Moreover, the coating layer, be it 16, 116 or 216 is not formed from a material in powder form.

It is accordingly an object of the present invention to provide a process for enclosing a pin shank within an enclosing member, and the article produced thereby.

It is a further object of the present invention to provide a process for forming a composite welding stud by enclosing a pin formed of a weldable metal within an enclosing member of a dissimilar material, and the composite welding stud produced thereby.

The foregoing and other objects of the present invention will be best understood from the following description, reference being had to the accompanying drawings wherein.

The present invention provides a process for enclosing a pin shank within an enclosing member. It comprises the steps of: providing a pin having a head and a shank; providing an enclosing member; inserting the shank into the enclosing member; and sintering the enclosing member. The enclosing member adheres to the shank during sintering. The pin is formed of a metal. Steel is presently preferred. The cross-section of the pin's head is larger than that of the pin's shank in a direction normal to the length of the pin. The cross-section of the shank is larger, in a direction normal to the length of the pin, adjacent the head than over other parts thereof. The larger cross-section of the shank is generally less than 30% of the length of the shank, and usually less than 20%. The preferred amount cannot be set forth as it is dependent on many factors including the materials involved. Material in powder form is used to form the enclosing member. The powder is one which will provide the stud with a property not attributable to the metal of the pin. Although it will generally be a metal having better wear and/or corrosion resistance than the metal from which the pin is formed, we have reason to believe that it need not be a metal, and that it could be another material such as a ceramic or a metal carbide; e.g., tungsten carbide, or a metal boride; e.g. titanium diboride. Exemplary metals include nickel-base and cobalt-base alloys and stainless steel. Sintering temperatures are not specified as they depend upon many factors including the type of metal being sintered. They are well known to those skilled in the art. It is within the scope of the invention to partially sinter the enclosing member before the shank is inserted therein. Illustrative sintering temperatures are disclosed in U.S. Pat. Nos. 4,123,266 and 4,129,444. The enclosing member is generally in the shape of a sleeve or cap. It is theorized that a metallurgical bond forms, during sintering, between the enclosing member and the shank of the pin.

Figure 1:
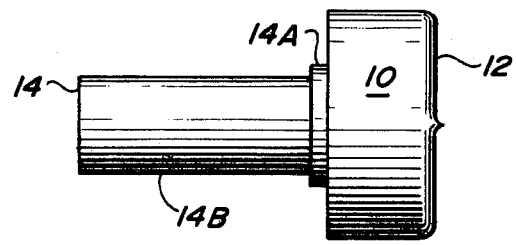
FIG. 1 is a side view of a pin for use in accordance with the present invention.
Figure 2:
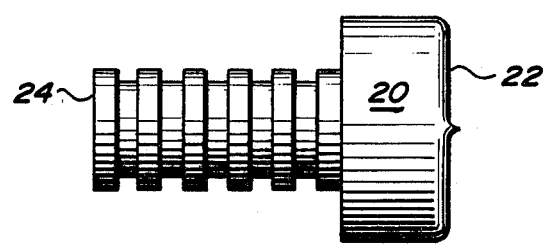
FIG. 2 is a side view of a prior art pin.

A pin for use in accordance with the present invention is shown in FIG. 1 as 10. A prior art pin is shown in FIG. 2 as 20. The pin of FIG. 1 is comprised of head 12 and shank 14. The cross-section of the pin's head is larger than that of the pin's shank in a direction normal to the length of the pin. The cross-section of the shank is larger, in a direction normal to the length of the pin, adjacent the head than over other parts thereof. This larger section of the shank is identified as 14A. It comprises less than 20% of the length of the shank. The smaller section of the shank is identified as 14B. Section 14A holds the enclosing member up and against the head, during sintering, so that the article of the present invention is substantially devoid of a gap therebetween (see FIG. 3 discussed hereinbelow). The same does not occur with the prior art pin of FIG. 2 (head 22 and shank 24). Shrinkage is believed to pull the enclosing member away from head 22 during sintering.

The article of the present invention finds particular utility as a welding stud. It is comprised of a pin and an enclosing member. As discussed hereinabove, the pin and the enclosing member are formed from dissimilar materials. The pin is comprised of a head and a shank. The enclosing member fits over and is adhered to the shank. The cross-section of the head is larger than that of the shank in a direction normal to the length of the pin. The cross-section of the shank is larger, in a direction normal to the length of the pin, adjacent the head than over other parts thereof. It is this shaping of the shank which causes the enclosing member to fit up against the head so that the article is substantially devoid of a gap therebetween. The larger cross-section of the shank is generally less than 30% of the length of the shank, and usually less than 20%. Its cross-section is usually substantially uniform therealong. The enclosing member is formed from a material in powder form. A cobalt-base alloy is presently preferred. The pin is formed from a metal. Steel is presently preferred. The enclosing member is usually in the form of a cap or sleeve. It is generally at least 0.04 inch (0.0010 meter) thick.

Figure 3:
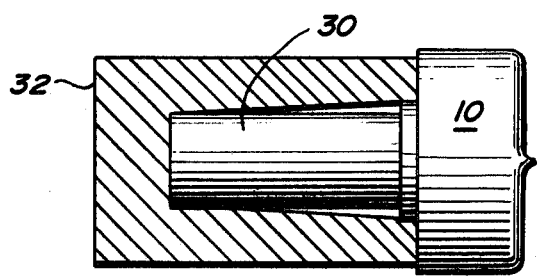
FIG. 3 is a side view partly in cross-section of an article made with the pin of FIG. 1.

A composite welding stud in accordance with the present invention is shown in FIG. 3. FIG. 3 is a side view partly in cross-section of an article made with the pin of FIG. 1. Shown therein are stud 30 formed from pin 10 and cap 32. Note the absence of a gap between the head of pin 10 and cap 32.

Figure 4:
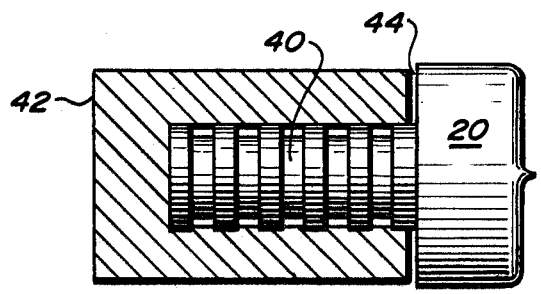
FIG. 4 is a side view partly in cross-section of an article made with the pin of FIG. 2.

A composite welding stud formed with the prior art pin of FIG. 2 is shown in FIG. 4. FIG. 4, like FIG. 3, is a side view partly in cross-section. Shown therein are stud 40 formed from pin 20 and cap 42. Note the presence of gap 44 between the head of pin 20 cap 42.

The following examples are illustrative of several aspects of the invention.

Enclosing members in the form of caps were prepared from an alloy known as STELLITE ® alloy No. 3PM. STELLITE is a registered trademark of Cabot Corportion. STELLITE alloy No. 3PM is a cobalt-base alloy having up to 3% nickel, up to 1% silicon, up to 3% iron, up to 1% manganese, 31% chromium, 12.5% tungsten, 2.4% carbon and up to 1% boron.

Several caps were placed upon steel pins having a configuration as shown in FIG. 2. The caps were subsequently sintered at a temperature of from 2140° to 2200° F. (1444.3° to 1477.6° K.) for a period of from one to three hours. The resulting articles had a gap on the outside diameter between the cap and the head of the pin. The gap varied from 0.010 to 0.060 inch (0.00025 to 0.0015 meter). Changing the inside diameter of the cap changed the gap somewhat, but did not provide a means for consistently controlling gap size.

Additional caps were placed upon steel pins having a configuration as shown in FIG. 1. These caps were also sintered at a temperature of from 2140° to 2200° F. (1444.3° to 1477.6° K.) for a period of from one to three hours. The resulting articles did not show any sign of a gap. A gap was not present between the cap and the head of the pin. The articles were produced in accordance with the present invention. The articles were produced with the pin of FIG. 1.

It will be apparent to those skilled in the art that the novel principles of the invention disclosed herein in connection with specific examples thereof, will suggest various other modifications and applications of the same. It is accordingly desired that in construing the breadth of the appended claims they shall not be limited to the specific examples of the invention described herein.

We claim:

1. A process for enclosing a pin shank within an enclosing member, comprising the steps of: providing a pin having a head and a shank, the pin being formed from a metal, the cross-section of the head being larger than that of the shank in a direction normal to the length of the pin, and in the same direction, the cross-section of the shank being larger adjacent the head then over all other parts thereof, the larger cross-section of the shank being less than 30% of the length of the shank; providing an enclosing member, the enclosing member being of material dissimilar to that of the pin, the enclosing member being formed from material in powder form; inserting the shank into the enclosing member; and sintering the enclosing member, the enclosing member adhering to the shank during sintering, the enclosing member fitting up against the head so that the article is substantially devoid of a gap therebetween.

2. A process in accordance with claim 1 wherein the enclosing member is a cap.

3. A process in accordance with claim 1 wherein the pin is a steel pin.

4. A process in accordance with claim 1 wherein the enclosing member is formed from a cobalt-base alloy.

5. A process in accordance with claim 1 wherein the larger cross-section of the shank is less than 20% of the length of the shank.

6. A composite article comprising a pin and an enclosing member, the pin and the enclosing member being of dissimilar materials, wherein: the pin is comprised of a head and a shank; the pin is formed from a metal; the enclosing member fits over and is adhered to the shank; the enclosing member is formed from a material in powder form; the cross-section of the head is larger than that of the shank in a direction normal to the length of the pin; the cross-section of the shank is larger, in a direction normal to the length of the pin, adjacent the head than over all other parts thereof; and the enclosing member fits up against the head so that the article is substantially devoid of a gap therebetween.

7. An article in accordance with claim 6 wherein the enclosing member is a cap.

8. An article in accordance with claim 6 wherein the pin is a steel pin.

9. An article in accordance with claim 6 wherein the enclosing member is formed from a cobalt-base alloy.

10. An article in accordance with claim 6 wherein the larger cross-section of the shank is less than 30% of the length of the shank.

11. An article in accordance with claim 10 wherein the larger cross-section of the shank is less than 20% of the length of the shank.

12. An article in accordance with claim 6 wherein the larger cross-section of the shank is substantially uniform along its length.

13. An article in accordance with claim 6 wherein the article is a welding stud.

14. An article in accordance with claim 6 wherein the enclosing member is at least 0.04 inch thick.

* * * * *